(12) United States Patent
Feng

(10) Patent No.: US 11,434,627 B2
(45) Date of Patent: Sep. 6, 2022

(54) ONE TYPE OF DUAL-SENSING BASIN FAUCET

(71) Applicant: Jun Feng, Xiangxiang (CN)

(72) Inventor: Jun Feng, Xiangxiang (CN)

( * ) Notice: Subject to any disclaimer, the term of this patent is extended or adjusted under 35 U.S.C. 154(b) by 0 days.

(21) Appl. No.: 17/383,462

(22) Filed: Jul. 23, 2021

(65) Prior Publication Data

US 2021/0348368 A1 Nov. 11, 2021

(30) Foreign Application Priority Data

Mar. 20, 2021 (CN) .......................... 202110300002.2

(51) Int. Cl.
| | | |
|---|---|---|
| *F16K 21/00* | (2006.01) | |
| *E03C 1/04* | (2006.01) | |
| *E03C 1/05* | (2006.01) | |
| *F16K 11/00* | (2006.01) | |

(52) U.S. Cl.
CPC ............... *E03C 1/04* (2013.01); *E03C 1/057* (2013.01); *F16K 19/006* (2013.01); *E03C 2001/0418* (2013.01)

(58) Field of Classification Search
CPC .......... E03C 1/04; E03C 1/0404; E03C 1/057; E03C 2001/0418; F16K 19/006
See application file for complete search history.

(56) References Cited

U.S. PATENT DOCUMENTS

| | | | | |
|---|---|---|---|---|
| 9,359,749 | B1* | 6/2016 | Mellits | ..................... E03C 1/04 |
| 2014/0014209 | A1* | 1/2014 | King | ....................... F16L 55/00 |
| | | | | 137/798 |
| 2014/0101844 | A1* | 4/2014 | Wawrla | ................ E03C 1/0401 |
| | | | | 4/638 |
| 2015/0308088 | A1 | 10/2015 | Enlow et al. | |
| 2017/0059050 | A1* | 3/2017 | Chiu | ....................... F16K 21/06 |
| 2017/0342691 | A1* | 11/2017 | Yan | ......................... F16K 31/44 |
| 2020/0041012 | A1 | 2/2020 | Chang et al. | |
| 2020/0102725 | A1 | 4/2020 | Fourman et al. | |
| 2020/0340221 | A1* | 10/2020 | Peng | ..................... E03C 1/0403 |

* cited by examiner

*Primary Examiner* — Reinaldo Sanchez-Medina

(57) ABSTRACT

This invention shows a type of dual-sensing basin faucet, includes the shell of faucet, the shell of this faucet is setting a valve seat with adjustment switch. The top of valve seat is connected to the cavity of water outlet and cavity of solenoid valve. There is the outlet tube inside the cavity of water outlet and a solenoid valve inside the cavity of solenoid valve. Both outlet tube and solenoid valve are setting inside the shell of this faucet. There is circuit board setting on the top of outlet tube, and the circuit board is electrically connected with the solenoid valve. There is a support plate that is setting above the circuit board and is firmly connected with the circuit board.

7 Claims, 5 Drawing Sheets

ONE TYPE OF DUAL-SENSING BASIN FAUCET

TECHNICAL FIELD

This invention refers to a daily-life field, one type of dual-sensing basin faucet in particular.

BACKGROUND TECHNOLOGY

Faucet is valve that can control the water flow. The rate of the replacement of faucets is quite high, from the old-fashioned iron-cast technology to the electroplated knob type, and later the stainless single-temperature-control. Nowadays, the stainless single handle dual-control faucet is domestic faucet in many families, and later the type of faucet of kitchen combination, which have brought a lot conveniences to people. But basically the basin faucets we use are controlled through the handle by manual operation, and the dirt in your hands will adhere to the handle when you touch it. Also, it is not easy to operate the faucet when you have things in both your hands, which will be an impact in faucet's daily using.

CONTENT OF INVENTION

The purpose of this invention is to provide a dual-sensing basin faucet with simple structure and convenient usage in respond to the problems mentioned above.

To reach this purpose, the technology solution for this invention is as following:

One type of dual-sensing basin faucet, includes the shell of faucet, there is a valve seat setting inside the shell of faucet, and there is a regulation switch setting on the valve seat. The cavity of water outlet and cavity of solenoid valve are connected with the top of the valve seat, the water outlet pipe is connected with the cavity of water outlet and the solenoid valve is connected with the cavity of solenoid valve. Both water outlet pipe and solenoid valve are set inside the shell of faucet. There is a circuit board setting above the water outlet pipe which electrically connects with the solenoid valve. There is a support board setting above the circuit board which firmly connects with the circuit board. The support board is above the top of the shell of faucet and firmly connecting with it. One side of the shell of faucet has a switching through hole, which is corresponding to the valve seat and there is a water control valve core setting inside the switching, through hole.

To be further, there are water inlet channel, water outlet channel, regulation channel, the first water control channel and the second water control channel setting on the valve seat. One end of the water inlet channel lies in the bottom of valve seat and connects with the outside waterway, the other end of the water inlet channel connects with the switching through hole. One end of the water outlet channel connects with the switching through hole, the other end of the water outlet channel connects with the cavity of solenoid valve, there is the regulation channel applying under the cavity of solenoid valve, the first water-control channel and second water-control channel are applying between the regulation channel and the cavity of solenoid valve. There is a solenoid valve setting inside the cavity of solenoid valve and it controls the switching condition of the second water-control channel. One end of the regulation channel connects with the cavity of water outlet, the other end of the regulation channel passes through the outside lateral wall of valve seat, there is a regulation switch connecting inside the regulation channel.

And there is a water channel setting inside the regulation switch, one end of this water channel passes through the regulation switch and near by the cavity of water outlet, the other end of this water channel passes through the outside lateral wall of regulation switch. When the regulation switch in the first gear, the first water-control channel is connected with the cavity of water outlet by the regulation channel. When the regulation switch in the second gear, second water-control channel is connected with the cavity of water outlet by the water channel.

To be further, the water outlet pipeline includes first water outlet pipe and second water outlet pipe that are mutually perpendicular and detachable to connect. The bottom of the first water outlet pipe connects with the top of the cavity of water outlet, and the top of the first water outlet pipe connects with one end of the second water outlet pipe, the other end of the second water outlet pipe passes through the first connector setting on the shell of this faucet and connects with the core of aerator.

To be further, there is the first sensing probe setting in front of the circuit board, the first sensing probe is corresponding to the second connector that is setting in the front end of the shell of this faucet. When the circuit board is in the shell of this faucet, the first sensing probe extends from the second connector. There is the second sensing probe setting in the side of the circuit board, the second sensing probe is corresponding to the third connector that is setting in the side of the shell of this faucet. When the circuit board is in the shell of this faucet, the second sensing probe extends from the third connector.

To be further, a temperature sensor is setting in the side of the top of the first water outlet pipe, and this temperature sensor is in a threaded connection with the top of the first water outlet pipe and its sensing end is inside the first water outlet pipe. Also, this temperature sensor is electrically connected with the temperature display screen that is setting on the top of the circuit board. There is a viewport setting in the support board, the inside wall of this viewport has a protection gasket, and the temperature display screen passes through the viewport. There is a transparent panel setting above the support board and it is firmly connected with the support board.

To be further, there is a control knob setting outside of the water control valve core and it is firmly connected with the knob end of the water control valve core.

To be further, there is a lighting ring setting outside of the shell of this faucet, it is in the position of outside of switching through hole and electrically connected with the temperature sensor.

Comparing to the present technology, the advantages and positive effects of this invention are as following:

This invention allows, when people use this faucet, they are able to operate the control of the water outlet conditions of faucet in two ways of the water control valve core and the sensing probe on the circuit board by applying the design of setting a cavity of solenoid valve and the cavity of water outlet above the valve seat. Meanwhile, people are able to switch one way of water outlet to another of this faucet simply through the regulation switch. When people operate the faucet through the water control valve core, first step is to turn on the water control valve core, move the water control switch to the first gear, then the water will flow through the water inlet channel and the water outlet channel to get inside the cavity of solenoid valve. The cavity of solenoid valve and the first water control channel are both in a unimpeded condition, therefore, it realizes the operation of water outlet when the water flows through the regulation channel and comes out from the cavity of water outlet and water outlet pipe. When people operate the faucet through the sensing probe, they use their hands to touch the sensing probe, the circuit board controls the solenoid valve to open the second water control channel and move the water control switch to the second gear at the same time, the water flows through the water channel, cavity of water outlet and water outlet pipe. It only needs to solenoid valve to close the second water control channel when you want to turn if off. The simple and convenient operation keeps the control hand from being contaminated and frees your hands at the same time. It really improve the effect in faucet's daily usage especially when you have things in both of your hands.

DESCRIPTION OF ATTACHING IMAGES

In order to make an explanation of the examples of this invention or the technology solution of present technology more clearly, here's to make a simple introduction of the attaching images that are needed in the description of samples or present technology. Apparently, the attaching images as following are only some of the examples of this invention. For the regular technical personnel in this field, they can acquire any other images according to the following images on the premise of unreached creative achievements.

SPECIFIC IMPLEMENTED EMBODIMENTS

Figure 1:
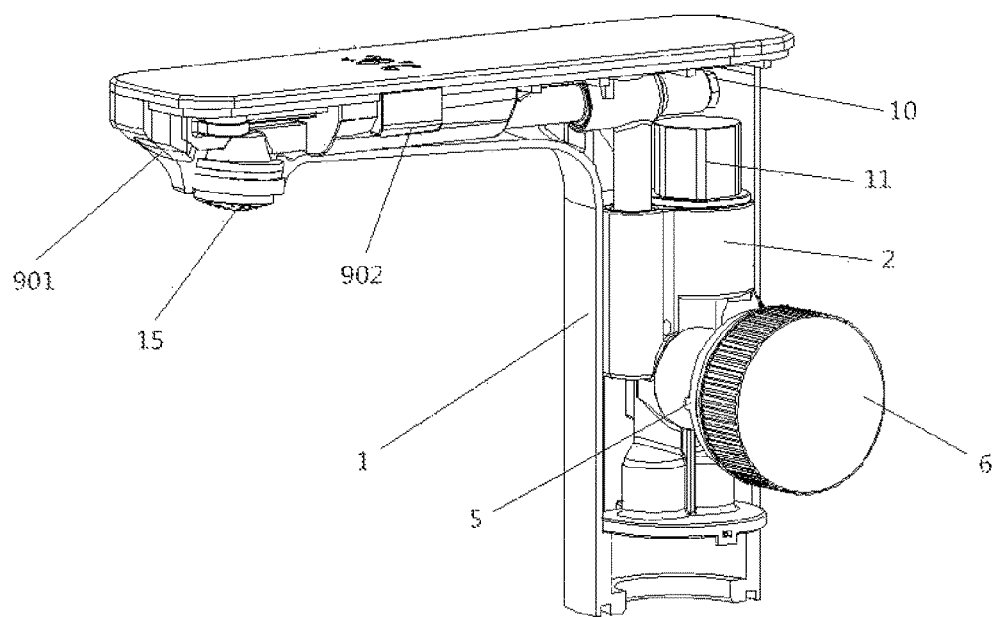
FIG. 1 is a schematic diagram of overall structure of this invention.
Figure 2:
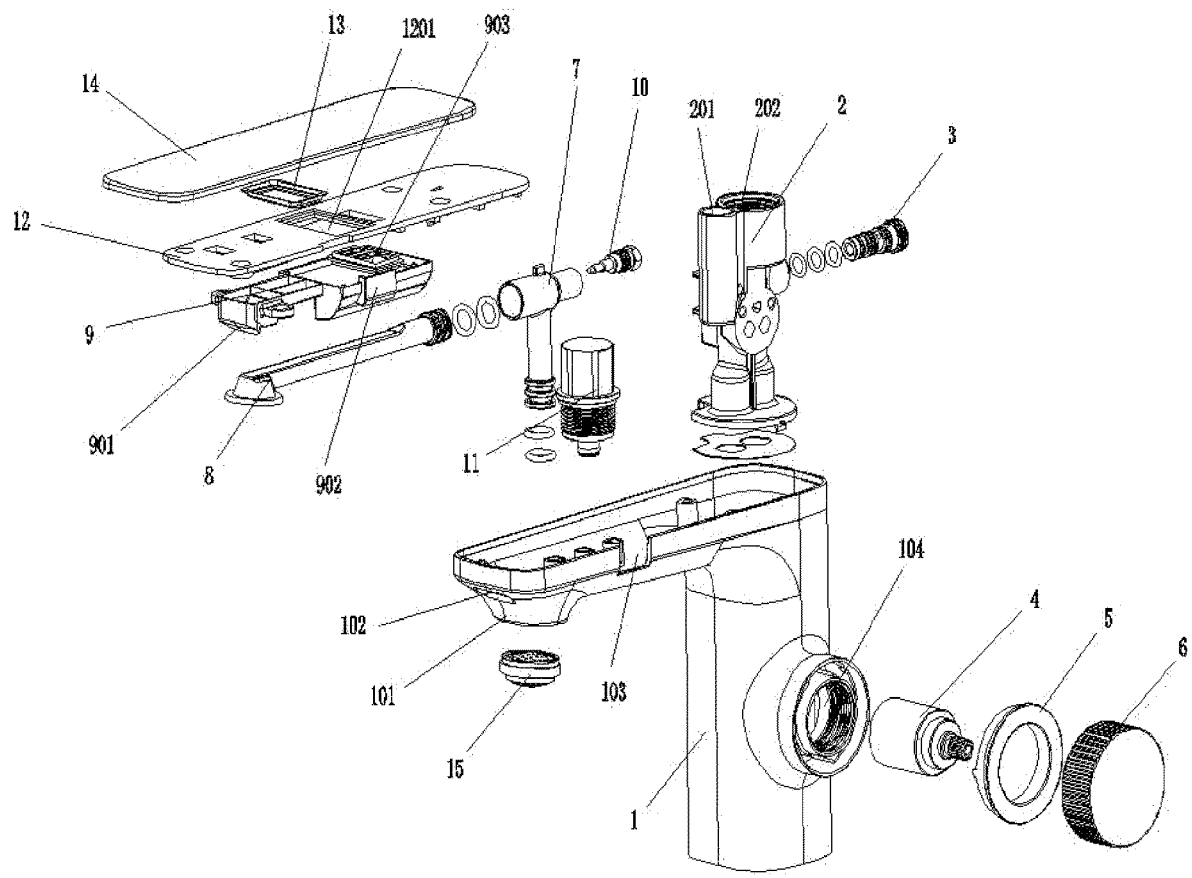
FIG. 2 is a schematic diagram of assembling structure of this invention.
Figure 3:
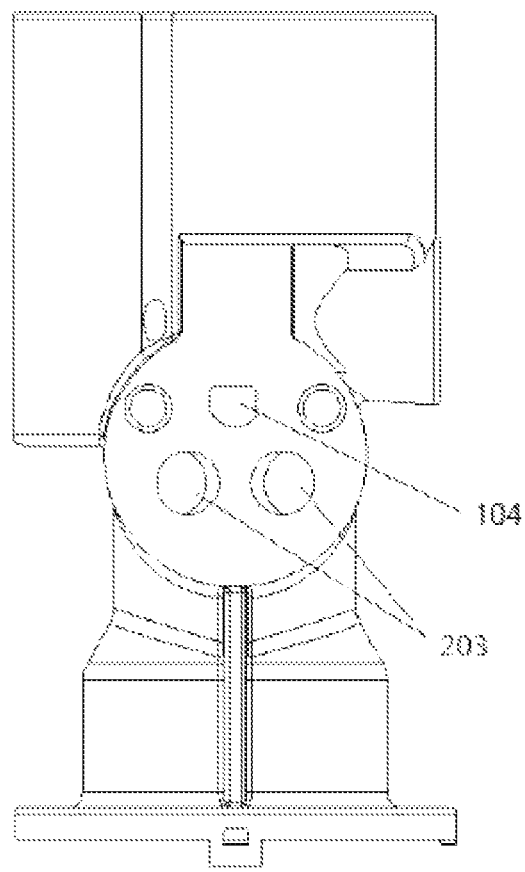
FIG. 3 is a front view of the structure of valve seat.
Figure 4:
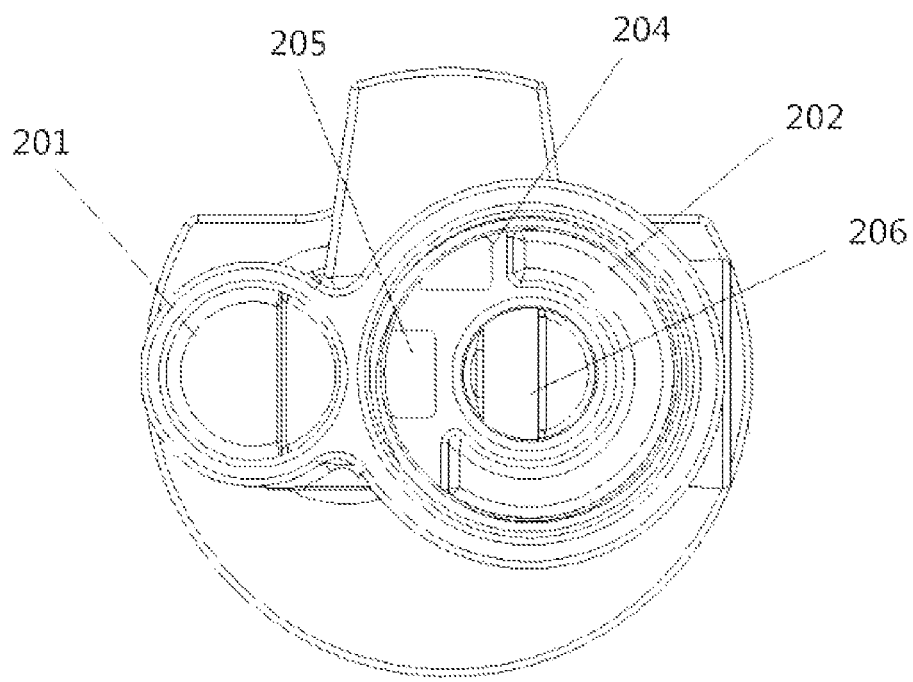
FIG. 4 is a vertical view of the structure of valve seat.
Figure 5:
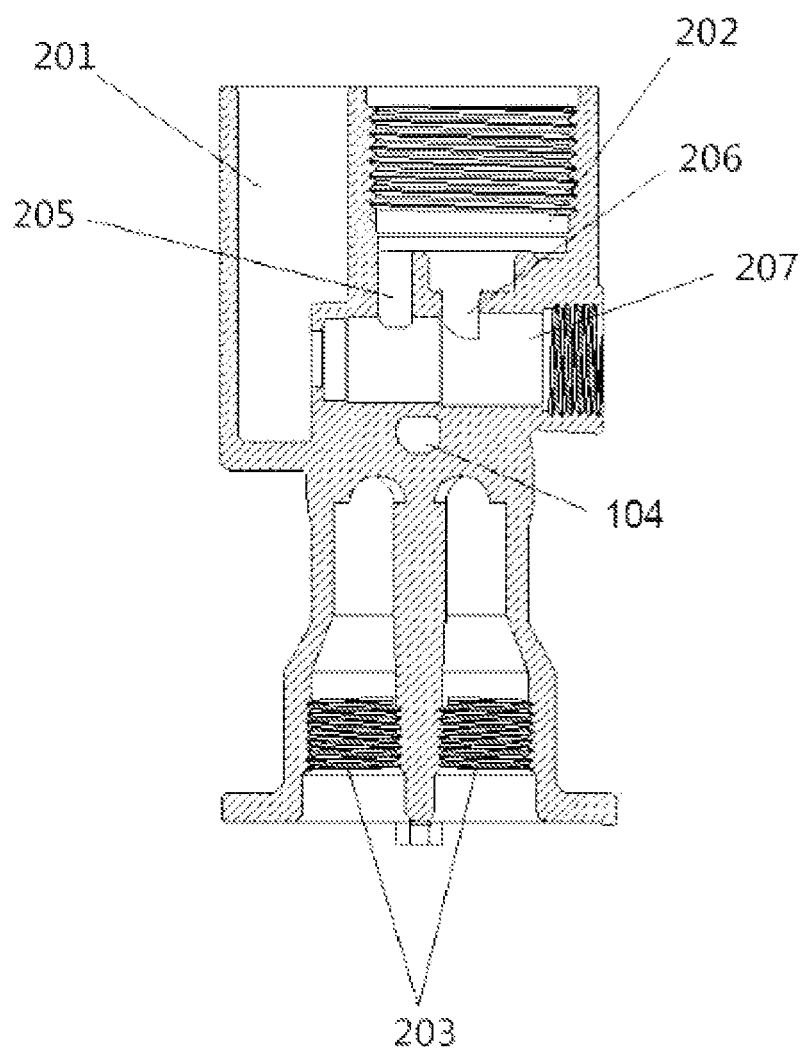
FIG. 5 is a section view of the structure of valve seat.
Figure 6:
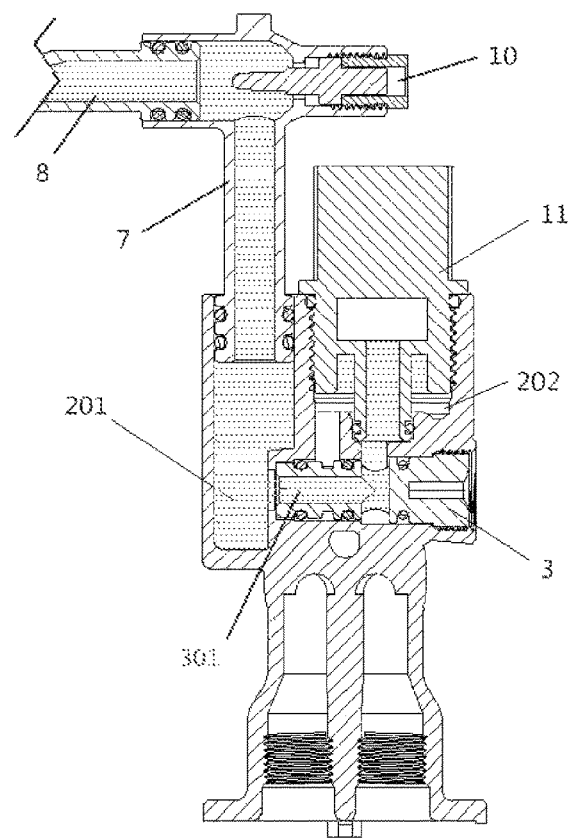
FIG. 6 is a schematic diagram of first condition of valve.
Figure 7:
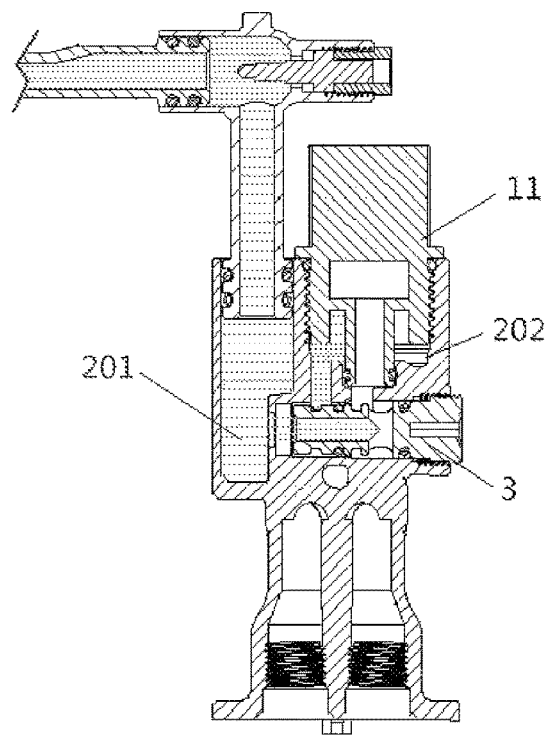
FIG. 7 is a schematic diagram of second condition of valve.

Combine the images and the examples of this invention, it is able to make a clear and complete description about the technology solutions in the examples of this invention. It is obvious that the examples of the statement are only part of the examples of this invention, but not all of them. Base on the examples of this invention, any alteration and equivalent replacement and improvement that acquire on the premise that our regular technical personnel haven't make the creative achievements, are all belonging to the protective range of this invention.

As we can see from IMAGE I to IMAGE VII, this example shows one type of dual-sensing basin faucet, includes the shell of faucet (1), there is a valve seat (2) setting inside the shell of faucet (1), there is a regulation switch (3) setting on the valve seat (2). The cavity of water outlet (201) and the cavity of solenoid valve (202) are both connected with the top of the valve seat (2). There is a water outlet pipe setting inside the cavity of water outlet (201) and there is a solenoid valve (11) setting inside the cavity of solenoid valve (202). Both the solenoid valve (11) and water outlet pipe are setting inside the shell of faucet (1). There is a circuit board (9) setting above the water outlet pipe and the circuit board (9) electrically connects with the solenoid valve (11). There is support board (12) setting above the circuit board (9) and the support board (12) firmly connects with the circuit board (14). The support board (12) lies above the top of the shell of faucet (1) and firmly connects with it. There is a switching through hole (104) setting in one side of the shell of faucet (1). The switching through hole (104) is corresponding to the valve seat (2) and has a water control valve core (4) inside. There is a control knob (6) setting outside the water control valve core (4), the control knob (6) firmly connects with the knob end of the water control valve core (4).

There are water inlet channel (203), water outlet channel (204), regulation channel (207), first water-control channel (205) and second water-control channel (206) setting on the valve seat (2). One end of the water inlet channel (203) lies in the bottom of valve seat (2) and connects with the outside waterway, the other end of the water inlet channel (203) connects with the switching through hole (104). One end of the water outlet channel (204) connects with the switching through hole (104), the other end of the water outlet channel (204) connects with the cavity of solenoid valve (202), there is the regulation channel (207) applying under the cavity of solenoid valve (202), the first water-control channel (205) and second water-control channel (206) are applying between the regulation channel (207) and the cavity of solenoid valve (202). There is a solenoid valve (11) setting inside the cavity of solenoid valve (202) and it controls the switching condition of the second water-control channel (206). One end of the regulation channel (207) connects with the cavity of water outlet (201), the other end of the regulation channel (207) passes through the outside lateral wall of valve seat (2), there is a regulation switch (3) connecting inside the regulation channel (207). And there is a water channel (301) setting inside the regulation switch (3), one end of this water channel (301) passes through the regulation switch (3) and near by the cavity of water outlet (201), the other end of this water channel (301) passes through the outside lateral wall of regulation switch (3). When the regulation switch (3) in the first gear as IMAGE VII shows, the first water-control channel (205) is connected with the cavity of water outlet (201) by the regulation channel (207). When the regulation switch (3) in the second gear as IMAGE VI shows, the second water-control channel (206) is connected with the cavity of water outlet (201) by the water channel (301).

The water outlet pipeline includes first water outlet pipe (7) and second water outlet pipe (8) that are mutually perpendicular and detachable to connect. The bottom of the first water outlet pipe (7) connects with the top of the cavity of water outlet (201), and the top of the first water outlet pipe (7) connects with one end of the second water outlet pipe (8), the other end of the second water outlet pipe (8) passes through the first connector (101) setting on the shell of this faucet (1) and connects with, the core of aerator (15).

There is the first sensing probe (901) setting in front of the circuit board (9), the first sensing probe (901) is corresponding to the second connector (102) that is setting in the front end of the shell of this faucet (1). When the circuit board (9) is in the shell of this faucet (1), the first sensing probe (901) extends from the second connector (102). There is the second sensing probe (902) setting in the side of the circuit board (9), the second sensing probe (902) is corresponding to the third connector (103) that is setting in the side of the shell of this faucet (1). When the circuit board (9) is in the shell of this faucet (1), the second sensing probe (902) extends from the third connector (103).

The first sensing probe is automatically sensing your hands approach and control the solenoid valve to open the second water control channel when you want to wash your hands, then the faucet realizes the water outlet function. The first sensing probe will stop functioning as soon as your hands leave, and the solenoid valve will control the faucet to stop outflowing. The second probe will process to activate the solenoid valve to outflow for three minutes at the first sensing, it will automatically stop outflowing when the time is up.

A temperature sensor (10) is setting in the side of the top of the first water outlet pipe (7), and this temperature sensor (10) is in a threaded connection with the top of the first water outlet pipe (7) and its sensing end is inside the first water outlet pipe (7). Also, this temperature sensor (10) is electrically connected with the temperature display screen (903) that is setting on the top of the circuit board (9). There is a viewport (1201) setting in the support board (12), the inside wall of this viewport (1201) has a protection gasket (13), and the temperature display screen (903) passes through the viewport (1201). There is a glass cover-plate (14) setting above the support board (12) and it is firmly connected with the support board (12). There is a transparent windows setting in the glass cover-plate (14).

This temperature sensor can detect the water temperature, and you can read the actual water temperature from the temperature display screen, which avoid the situation like being scalded and improve the effect faucet's daily usage.

There is a lighting ring (5) setting outside of the shell of this faucet (1), it is in the position of outside of switching through hole (104) and electrically connected with the temperature sensor (10). The lighting ring will change into different colors according to the variation of water temperature, red light for hot water, green light for warm water and blue light for cold water. It is integrated in the faucet, there will be a excellent experience when you are using it.

This invention allows, when people use this faucet, they are able to operate the control of the water outlet conditions of faucet in two ways of the water control valve core and the sensing probe on the circuit board by applying the design of setting a cavity of solenoid valve and the cavity of water outlet above the valve seat. Meanwhile, people are able to switch one way of water outlet to another of this faucet simply through the regulation switch. When people operate the faucet through the water control valve core, first step is to turn on the water control valve core, move the water control switch to the first gear, then the water will flow through the water inlet channel and the water outlet channel to get inside the cavity of solenoid valve. The cavity of solenoid valve and the first water control channel are both in a unimpeded condition, therefore, it realizes the operation of water outlet when the water flows through the regulation channel and comes out from the cavity of water outlet and water outlet pipe. When people operate the faucet through the sensing probe, they use their hands to touch the sensing probe, the circuit, board controls the solenoid valve to open the second water control channel and move the water control switch to the second gear at the same time, the water flows through the water channel, cavity of water outlet and water outlet pipe. It only needs to solenoid valve to close the second water control channel when you want to turn if off. The simple and convenient operation keeps the control hand from being contaminated and frees your hands at the same time. It really improve the effect in faucet's daily usage especially when you have things in both of your hands.

The invention claimed is:

1. A dual-sensing basin faucet, comprising a shell of the faucet, wherein the shell of the faucet is provided with a valve seat that comprises a regulation switch, a top of the valve seat comprising a cavity of a water outlet and a cavity of a solenoid valve, there is an outlet tube inside the cavity of a water outlet and a solenoid valve inside the cavity of a solenoid valve, both the outlet tube and the solenoid valve are arranged inside the shell of the faucet, there is a circuit board arranged on a top of the outlet tube, and the circuit board is electrically connected with the solenoid valve, there is a support plate arranged above the circuit board and is firmly connected with the circuit board, and the support plate is located at a top of the shell of the faucet and firmly connected with the shell of the faucet, one end of the shell of the faucet is provided with a switching through hole, which is corresponding with the valve seat, and there is a water control valve core arranged inside the switching through hole.

2. The dual-sensing basin faucet of claim 1, wherein the valve seat comprises a water inlet channel, a water outlet channel, a regulation channel, a first water-control channel and a second water-control channel, wherein one end of the water inlet channel is arranged at a bottom of the valve seat and connects with an outside waterway, the other end of the water inlet channel is connected with the switching through hole, one end of the water outlet channel is connected with the switching through hole, the other end of the water outlet channel is connected with the cavity of a solenoid valve, the regulation channel is arranged under the cavity of a solenoid valve, the first water-control channel and the second water-control channel are arranged between the regulation channel and the cavity of a solenoid valve, the solenoid valve controls a switching state of the second water-control channel, one end of the regulation channel is connected with the cavity of a water outlet, the other end of the regulation channel passes through an outside lateral wall of the valve seat, the regulation switch is arranged inside the regulation channel, and there is a water channel arranged inside the regulation switch, one end of the water channel passes through an end of the regulation switch adjacent to the cavity of a water outlet, the other end of the water channel passes through an outside lateral wall of the regulation switch, when the regulation switch is switched to a first position, the first water-control channel is connected with the cavity of a water outlet through the regulation channel, when the regulation switch is switched to a second position, the second water-control channel is connected with the cavity of a water outlet through the water channel.

3. The dual-sensing basin faucet of claim 2, wherein the outlet tube further comprises a water outlet pipeline, wherein the water outlet pipeline includes a first water outlet pipe and a second water outlet pipe that are mutually perpendicular and detachable to connect, a bottom of the first water outlet pipe is connected with a top of the cavity of a water outlet, and a top of the first water outlet pipe is connected with one end of the second water outlet pipe, the other end of the second water outlet pipe passes through a first connector arranged on the shell of the faucet and is connected with a core of a aerator.

4. The dual-sensing basin faucet of claim 3, wherein there is a first sensing probe arranged in front of the circuit board, the first sensing probe is corresponding to a second connector that is arranged in the front end of the shell of the faucet, when the circuit board is in the shell of the faucet, the first sensing probe extends from the second connector, there is a second sensing probe arranged on a side of the circuit board, the second sending probe is corresponding to a third connector that is arranged on a side of the shell of the faucet, when the circuit board is in the shell of the faucet, the second sensing probe extends from the third connector.

5. The dual-sensing basin faucet of claim 4, further comprising a temperature sensor arranged in the side of the top of the first water outlet pipe, wherein this temperature sensor is in a threaded connection with the top of the first water outlet pipe and a sensing end of the temperature sensor is inside the first water outlet pipe, this temperature sensor is electrically connected with a temperature display screen arranged on the top of the circuit board, there is a viewport arranged in the support plate, an inside wall of this viewport is provided with a protection gasket, and the temperature display screen passes through the viewport, there is a transparent panel arranged above the support plate and firmly connected with the support plate.

6. The dual-sensing basin faucet of claim 5, wherein there is a control knob arranged outside the water control valve core and firmly connected with a knob end of the water control valve core.

7. The dual-sensing basin faucet of claim 6, further comprising a lighting ring arranged outside the shell of the faucet, wherein the lighting ring is outside the switching through hole and is electrically connected with the temperature sensor.

* * * * *